United States Patent
Takahashi

(10) Patent No.: US 8,984,634 B2
(45) Date of Patent: Mar. 17, 2015

(54) QUARANTINE NETWORK SYSTEM, SERVER APPARATUS, AND PROGRAM

(75) Inventor: Yoshikazu Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 18 days.

(21) Appl. No.: 13/616,221

(22) Filed: Sep. 14, 2012

(65) Prior Publication Data

US 2013/0081139 A1 Mar. 28, 2013

(30) Foreign Application Priority Data

Sep. 26, 2011 (JP) ................................. 2011-208609

(51) Int. Cl.
| | |
|---|---|
| *G06F 17/30* | (2006.01) |
| *G06F 12/14* | (2006.01) |
| *G08B 23/00* | (2006.01) |
| *G06F 21/55* | (2013.01) |
| *G06F 21/56* | (2013.01) |
| *H04L 29/06* | (2006.01) |
| *G06F 11/30* | (2006.01) |
| *H04N 7/167* | (2011.01) |

(52) U.S. Cl.
CPC .............. *G06F 21/554* (2013.01); *G06F 21/56* (2013.01); *H04L 63/0209* (2013.01); *H04L 63/145* (2013.01); *H04L 63/20* (2013.01)
USPC ............................... 726/23; 713/187; 380/200

(58) Field of Classification Search
USPC ............ 726/23, 2–8; 713/168–174, 182–186, 713/202; 709/206, 225, 229, 249, 389
See application file for complete search history.

(56) References Cited

U.S. PATENT DOCUMENTS

| | | | |
|---|---|---|---|
| 2006/0021043 A1* | 1/2006 | Kaneko et al. ................... 726/24 |
| 2006/0268767 A1* | 11/2006 | Sato et al. ...................... 370/328 |
| 2007/0064109 A1* | 3/2007 | Renkis ........................... 348/159 |
| 2010/0333176 A1* | 12/2010 | Vank et al. ......................... 726/3 |

FOREIGN PATENT DOCUMENTS

WO 2004114599 A1 12/2004

* cited by examiner

*Primary Examiner* — Evans Desrosiers
(74) *Attorney, Agent, or Firm* — Sughrue Mion, PLLC

(57) ABSTRACT

A quarantine network system 100 quarantines terminals 30 and 31 connected to a network via a wireless communication. The quarantine network system 100 is provided with an access point 20 for a business NW used for connection to a business network, an access point 21 for a quarantine NW which is used for connection to a network for quarantining and restricts the number of terminals connectable thereto, and an NW switching performance server 10 transmitting to the terminal a command which makes the terminal switch SSID of an access point which the terminal uses for wireless communication, in accordance with the situation.

3 Claims, 13 Drawing Sheets

FIG.3

| TERMINAL INFORMATION | MAC ADDRESS | SSID TO BE CONFIGURED TO TERMINAL | TIME AND DATE WHEN QUARANTINING INSTRUCTION HAS BEEN RECEIVED |
|---|---|---|---|
| TERMINAL 30 | aa:bb:cc:dd:ee:ff | adbcde1493 | 06/14/2011 14:21:12 |
| TERMINAL 31 | ab:cd:ef:ac:bd:ce | 496dbe4d2 | 06/15/2011 15:52:41 |

FIG.8

|  | AP TO WHICH TERMINAL 30 IS CONNECTED | AP TO WHICH TERMINAL 31 IS CONNECTED |
|---|---|---|
| NORMAL | AP20 | AP20 |
| TERMINAL 30 QUARANTINING INSTRUCTION | AP21 | AP20 |
| TERMINAL 31 QUARANTINING INSTRUCTION | AP21 | NO CONNECTION |
| TERMINAL 30 RESTORING INSTRUCTION | AP20 | AP21 |
| TERMINAL 31 RESTORING INSTRUCTION | AP20 | AP20 |

QUARANTINE NETWORK SYSTEM, SERVER APPARATUS, AND PROGRAM

CROSS-REFERENCE TO RELATED APPLICATION

This application is based upon and claims the benefit of priority from Japanese patent application No. 2011-208609, filed on Sep. 26, 2011, the disclosure of which is incorporated herein in its entirety by reference.

BACKGROUND OF THE INVENTION

1. Field of the Invention

The present invention relates to a quarantine network system which can be used under a wireless LAN environment, a server apparatus used for it, and a program for realizing them.

2. Background Art

Nowadays, a quarantine network system attracts an attention as one technology of an information leakage countermeasure. The quarantine network system is a system which checks a security countermeasure state (an application state of a security patch distributed from a software vender or the like, an updating state of a pattern file of an anti-virus software, or the like) of a computer connected to an in-house LAN (Local Area Network).

The quarantine network system is a system which detects a terminal where the security countermeasure state does not conform to an in-house security policy, and then, quarantines it into a network for quarantining, and demands the application of the security patch or the like compulsorily from a user. By introducing the quarantine network system, enhancing an in-house security level is achieved. In addition, the quarantine network system detects a terminal infected with a computer virus, and also in that case, quarantines this into the network for quarantining, and prevents the computer virus infection from expanding.

Then, in a conventional general quarantine network system, a network used in a normal business (hereinafter, indicated as a "business network") and a network for quarantining a terminal where the security level is not enough (hereinafter, indicated as a "quarantine network") have been constructed by a VLAN (Virtual LAN).

In addition, for constructing the network like this, normally, a switch having a VLAN (Virtual LAN) function is used in order to perform control of the network more strictly (for example, refer to international publication No. WO 2004/114599). The switch like this is also referred to as a layer-2 intelligent switch, and controls the network in a layer lower than a layer of an internet protocol used for communication (data link layer).

However, in the quarantine network system, there is a case where also the terminal infected with a computer virus is quarantined into the same quarantine network as the network into which the terminal not conforming to the security policy is quarantined. In this case, the terminal infected with a computer virus and the terminal having a low security level become able to communicate with each other within the quarantine network, and a phenomenon that a terminal where the security level is only low will have been infected with a computer virus within the quarantine network will have arisen.

Therefore, for example, it is possible to consider a method where a VLAN is made to be allocated to every terminal, and the terminal infected with a computer virus is made to be quarantined from the terminal which does not conform to a security policy by the layer-2 intelligent switch mentioned above.

However, only terminals connected under a cable-LAN environment can be quarantined by means of the method using the L2 intelligent switch mentioned above. On the other hand, recent years, also in a company or the like, an introduction of a wireless LAN system advances, and terminals connected to a network wirelessly increase in number. Consequently, it is requested to quarantine terminals individually using the VLAN under the wireless LAN environment.

SUMMARY OF THE INVENTION

An example of a purpose of the present invention lies in providing a quarantine network system, a server apparatus, and a computer-readable recording medium which are capable of dissolving above-mentioned problems and quarantining terminals individually under a wireless LAN environment.

In order to achieve above-mentioned purposes, a first quarantine network system in an aspect of the present invention is a quarantine network system for quarantining a terminal connected to a network via a wireless communication, and the quarantine network system comprises:

a first wireless LAN access point used for connection to a business network;

a second wireless LAN access point which is used for connection to a network for quarantining, and which restricts the number of terminals connectable thereto; and a server apparatus transmitting to the terminal a command which makes the terminal switch SSID of an access point which the terminal uses in wireless communication, to SSID of the first wireless LAN access point, or to SSID of the second wireless LAN access point, in accordance with the situation.

In addition, in order to achieve above-mentioned purposes, a first server apparatus in an aspect of the present invention is a server apparatus for switching, in accordance with a quarantine result of a terminal, a network to which the terminal is connected via wireless communication, and the server apparatus comprises a network switching command transmitting unit, wherein the network switching command transmitting unit transmits to the terminal a command which makes the terminal switch SSID of an access point which the terminal uses in wireless communication, in accordance with the situation, to SSID of a first wireless LAN access point used for connection to a business network, or to SSID of a second wireless LAN access point which is used for connection to a network for quarantining and restricts the number of terminals connectable thereto.

Furthermore, in order to achieve above-mentioned purposes, a first computer-readable recording medium in an aspect of the present invention is the computer-readable recording medium recording a program for switching by a computer a network to which a terminal is connected via wireless communication in accordance with a quarantine result of the terminal, wherein the computer-readable recording medium records a program including an instruction to make the computer execute a step of transmitting a command which makes the terminal switch SSID of an access point which the terminal uses in wireless communication, in accordance with the situation, to SSID of a first wireless LAN access point used for connection to a business network, or to SSID of a second wireless LAN access point which is used for connection to a network for quarantining and restricts the number of terminals connectable thereto.

In order to achieve above-mentioned purposes, a second quarantine network system in an aspect of the present invention is a quarantine network system for quarantining a terminal connected to a network via wireless communication, and the quarantine network system comprises:

a wireless LAN access point used for connection to a business network; and a server apparatus, and the server apparatus further comprises:

a communication unit which performs an ad hoc communication to or from the terminal, and functions as a wireless LAN access point used for connection to a network for quarantining; and a network switching command transmitting unit transmitting a command which makes the terminal switch SSID of an access point which the terminal uses in wireless communication to SSID of the wireless LAN access point or to SSID of the communication unit, in accordance with the situation.

In addition, in order to achieve above-mentioned purposes, a second server apparatus in an aspect of the present invention is a server apparatus for switching, in accordance with a quarantine result of a terminal, a network to which the terminal is connected via wireless communication, and the server apparatus comprises:

a communication unit which performs an ad hoc communication to or from the terminal, and functions as a wireless LAN access point used for connection to a network for quarantining; and a network switching command transmitting unit transmitting a command which makes the terminal switch SSID of an access point which the terminal uses in wireless communication to SSID of a wireless LAN access point used for connection to a business network, or to SSID of the communication unit, in accordance with the situation.

Furthermore, in order to achieve above-mentioned purposes, a second computer-readable recording medium in an aspect of the present invention is the computer-readable recording medium recording a program for switching by a computer a network to which a terminal is connected via wireless communication in accordance with a quarantine result of the terminal, wherein in the case where the computer performs an ad hoc communication to or from the terminal, and can function as a wireless LAN access point used for connection to a network for quarantining, the computer-readable recording medium records a program including an instruction to make the computer execute a step of transmitting a command which makes the terminal switch SSID of an access point which the terminal uses for wireless communication, in accordance with the situation, to SSID of a wireless LAN access point used for connection to a business network, or to SSID in the case where the computer functions as the wireless LAN access point.

As mentioned above, according to the quarantine network system, server apparatus and program in the present invention, terminals can be quarantined individually under wireless LAN environments.

BRIEF DESCRIPTION OF THE DRAWINGS

FIG. 3 is a figure showing an example of terminal information stored in a terminal information database shown in FIG. 2;

FIG. 8 is a figure showing a connection state of two terminals in the case where Steps C1 to C35 shown in FIG. 7 are carried out;

EXEMPLARY EMBODIMENT

Embodiment 1

Hereinafter, a quarantine network system, a server apparatus, and a program, in the Embodiment 1 of the present invention, will be described with reference to FIG. 1 to FIG. 9.

[System Configuration]

Figure 1:
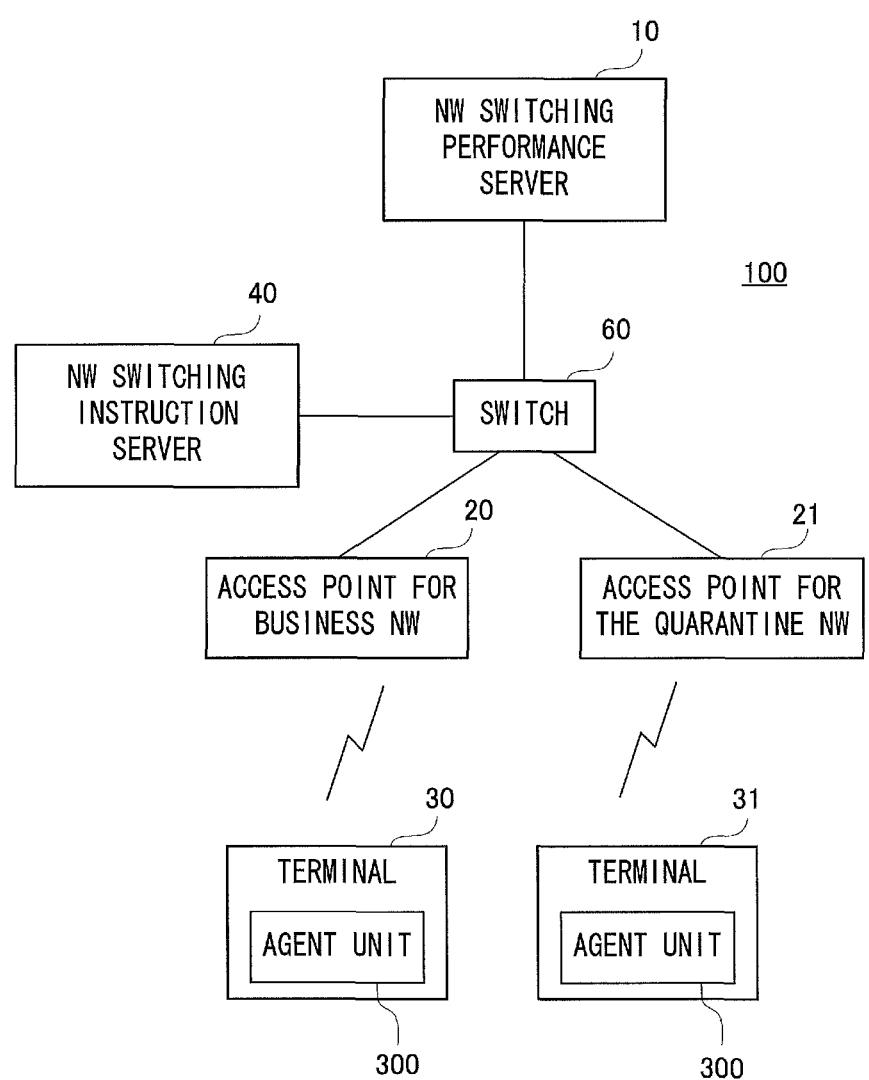
FIG. 1 is a block diagram showing a configuration of a quarantine network system in Embodiment 1 of the present invention.

At the beginning, a configuration of a quarantine network system 100 in the present Embodiment 1 will be described using FIG. 1. FIG. 1 is a block diagram showing the configuration of the quarantine network system in the Embodiment 1 of the present invention.

The quarantine network system 100 in the present Embodiment 1 shown in FIG. 1 is a system for quarantining a terminal 30 and a terminal 31 which are connected to a network via a wireless communication, and carries out quarantining and restoring of the terminal 30 and the terminal 31 in accordance with the quarantine result. As shown in FIG. 1, the quarantine network system 100 comprises a wireless LAN access point 20, a wireless LAN access point 21, and a server apparatus 10. Besides, although only two terminals are illustrated in an example of FIG. 1, the number of terminals which are objects for quarantining is not limited in particular in the present Embodiment 1.

The wireless LAN access point 20 is a wireless LAN access point used for connection to a business network.

The wireless LAN access point 21 is a wireless LAN access point used for connection to a network for quarantining.

In addition, in the wireless LAN access point 21, the number of terminals connectable thereto is restricted. Specifically, in the present Embodiment 1, it is restricted to one unit.

In addition, the server apparatus 10 transmits a command for making the terminals 30 and 31 switch SSID of an access point which each terminal uses in the wireless communication in accordance with a status of the each terminal. Specifically, the server apparatus 10 transmits a command for making a terminal requiring a connection to a quarantine network switch the SSID to the SSID of the wireless LAN access point 21. In addition, the server apparatus 10 transmits a command for making a terminal having become connectable to a business network switch the SSID to the SSID of the wireless LAN access point 20.

Besides, the "SSID" is an identifier for identifying the wireless LAN access points, and the terminals 30 and 31 select the wireless LAN access points which are to be connection destinations based on this SSID.

In this manner, in the quarantine network system 100 in the present Embodiment 1, the terminals will be connected to the appropriate networks in accordance with the status thereof under the wireless LAN environment. Then, in the wireless LAN access point used for the connection to the network for quarantining, since the number of terminals connectable thereto is restricted to one unit for example, it becomes possible to quarantine terminals individually under the wireless LAN environment.

Then, since it can be avoided easily that a terminal infected with a computer virus within the network for quarantining and a terminal having a low security level will be able to communicate with each other, a situation where a terminal having only a low security level has been infected with a computer virus within the network for quarantining is prevented from arising.

Here, a configuration of the quarantine network system 100 in the present Embodiment 1 will be described further specifically using FIG. 2 to FIG. 4 in addition to FIG. 1. First, as shown in FIG. 1, in the present Embodiment 1, the quarantine network system 100 further comprises a server apparatus 40 and a switch 60.

The switch 60 is a switching hub having a VLAN function, and makes some ports among ports provided therewith belong to the business network (business-use VLAN), and makes the remaining ports belong to the network for quarantining (VLAN for quarantine). In addition, the wireless LAN access point 20 is connected to the port belonging to the business network in the switch 60. On the other hand, the wireless LAN access point 21 is connected to the port belonging to the network for quarantining in the switch 60.

The server apparatus 40 is a so-called quarantine server, and carries out quarantining for each terminal. Then, the server apparatus 40 determines quarantining and restoring of terminals 30 and 31 based on the result of quarantining, and transmits a quarantine command or restoration command with respect to the terminal to the server apparatus 10. In addition, the server apparatus 10 and the server apparatus 40 are both connected to the ports belonging to the business network of the switch 60.

Then, in subsequent description, in order to discriminate the server apparatus 10 and the server apparatus 40, the server apparatus 10 is made to be indicated as "NW switching performance server 10", and the server apparatus 40 is made to be indicated as "NW switching instruction server 40". In addition, the wireless LAN access point 20 is made to be indicated as "access point 20 for the business NW", and the wireless LAN access point 21 is made to be indicated as "access point 21 for the business NW". "NW" is an abbreviated indication of network.

[Configuration of NW Switching Performance Server]

A configuration of the NW switching performance server 10 will be described specifically using FIG. 2 and FIG. 3.

Figure 2:
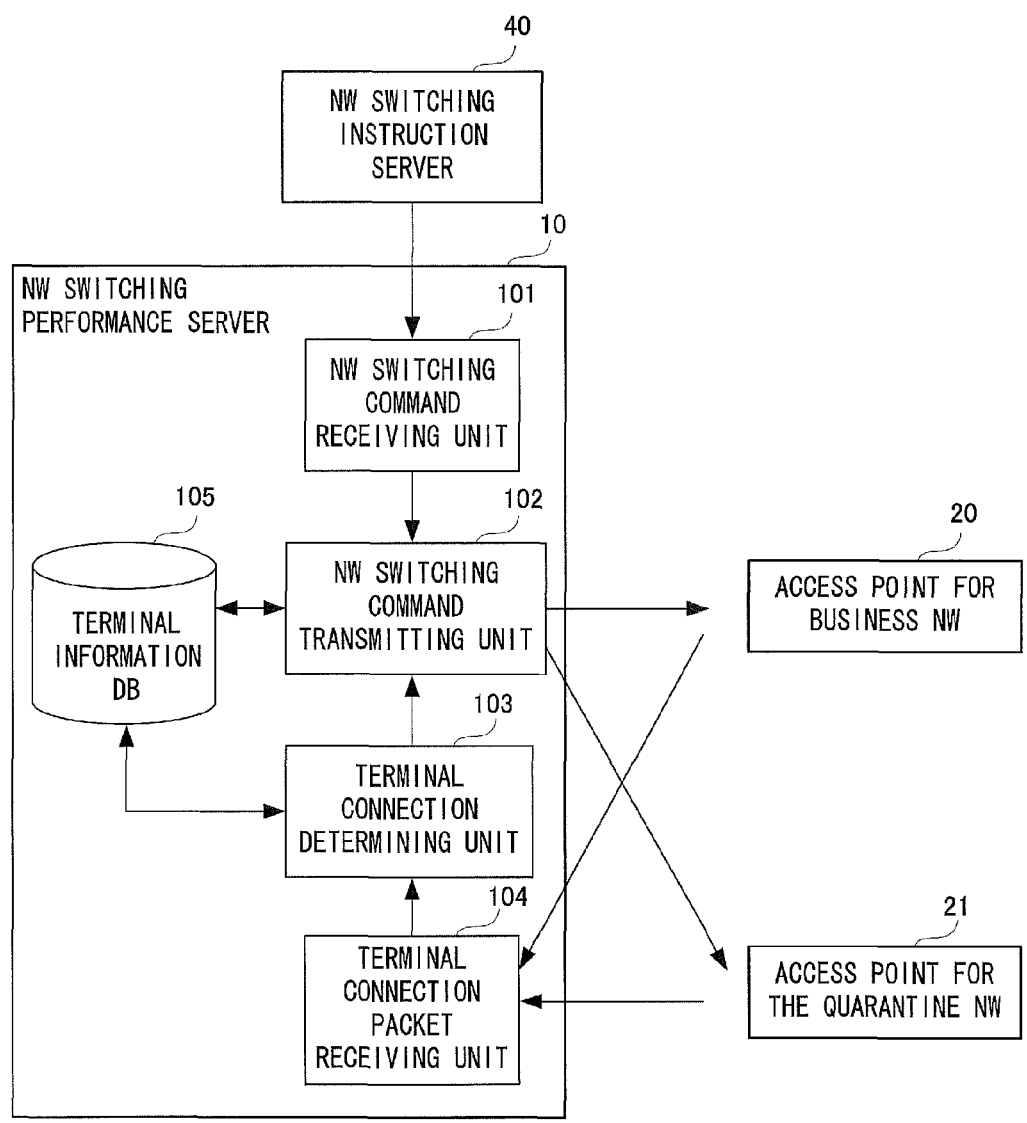
FIG. 2 is a block diagram showing a configuration of a network switching performance server in the Embodiment 1 of the present invention.

FIG. 2 is a block diagram showing a configuration of the network switching performance server in the embodiment of the present invention. FIG. 3 is a figure showing an example of terminal information stored in a terminal information database shown in FIG. 2.

As shown in FIG. 2, in the present Embodiment 1, the NW switching performance server 10 comprises an NW switching command receiving unit 101, an NW switching command transmitting unit 102, a terminal connection determining unit 103, a terminal connection packet receiving unit 104, and a terminal information database (DB) 105 that stores information on the terminals.

The NW switching command reception unit 101 receives an command from the NW switching instruction server 40, and transfers this to the NW switching command transmitting unit 102. The NW switching command transmitting unit 102, based on the accepted command, to a terminal connected via a wireless communication to the access point 20 for the business NW or the access point 21 for the quarantine NW, transmits a command (NW switching command) so as to switch the SSID of the access point via the access point to which it is connected currently.

The terminal connection packet receiving unit 104 receives a packet notifying of establishment of the connection with the terminal from the access point of the switch destination, and transmits this to the terminal connection determining unit 103. The terminal connection determining unit 103, based on the received packet, refers to the information (terminal information) stored in the terminal information DB 105, and determines whether the terminal connected to the access point of the switch destination is the terminal which is to be connected thereto.

In addition, as shown in FIG. 3, the terminal information DB 105 stores as terminal information for every terminal (every terminal identifier), a MAC address of the terminal, the SSID indicating the wireless LAN access point to which the terminal is to be connected, and a time and date when a quarantining instruction has been received from the NW switching instruction server 40.

[Configuration of Terminal]

Configurations of the terminal 30 and the terminal 31 will be described specifically using FIG. 4. FIG. 4 is a block diagram showing a configuration of a terminal used in the Embodiment 1 of the present invention. It should be noted that in the present Embodiment 1, the terminal 30 and the terminal 31 are provided with the same configuration. Therefore, in the following, the terminal 30 will be described as an example.

Figure 4:
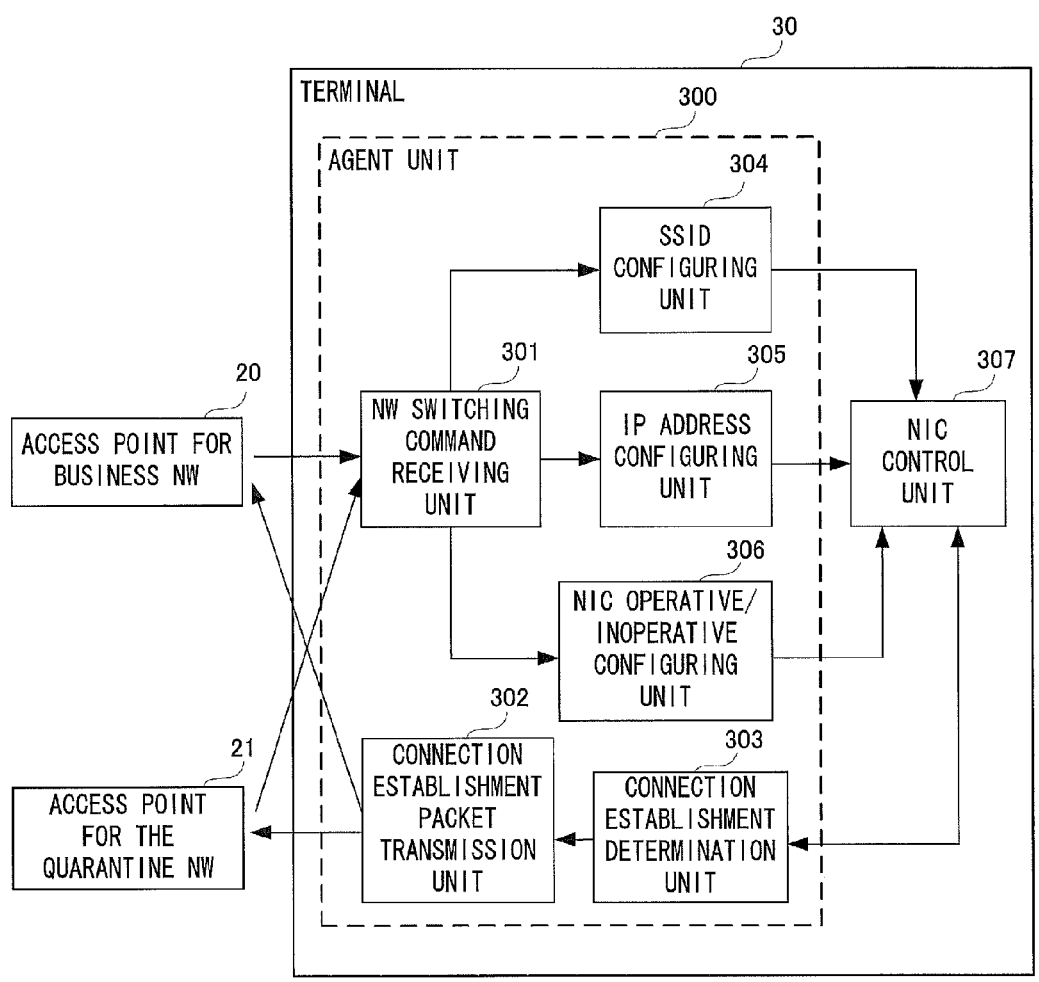
FIG. 4 is a block diagram showing a configuration of a terminal used in the Embodiment 1 of the present invention.

The terminal 30 comprises an agent unit 300 and a NIC (Network Interface Card) control unit 307 as shown in FIG. 4. Among these, the agent unit 300 is constructed by an agent program which operates on an OS (Operating System) of the terminal 30. The agent program is a program which determines whether the security policy of the terminal is fulfilled. In addition, the NIC control unit 307 is constructed by a program module mounted in the OS of the terminal.

In addition, as shown in FIG. 4, the agent unit 300 comprises an NW switching command receiving unit 301, a connection establishment packet transmission unit 302, a connection establishment determination unit 303, a SSID configuring unit 304, an IP address configuring unit 305, and a NIC operative/inoperative configuring unit 306.

The NW switching command receiving unit 301, when the NW switching command instructing of switching of the SSID is transmitted from the NW switching performance server 10, receives this. Then, the NW switching command receiving unit 301, based on the received NW switching command, performs instruction to the SSID configuring unit 304, the IP address configuring unit 305 and the NIC operative/inoperative configuring unit 306.

Specifically, the NW switching command receiving unit 301 instructs the SSID configuring unit 304 of configuration change of the SSID. The SSID configuring unit 304, based on the instruction, further instructs the NIC control unit 307 of the configuration change of the SSID.

In addition, the NW switching command receiving unit 301 instructs the IP address configuring unit 305 of switching of an IP address. The IP address configuring unit 305, based on the instruction of switching of the IP address, further instructs the NIC control unit 307 of switching of the IP address.

In addition, the NW switching command receiving unit 301 instructs the NIC operative/inoperative configuring unit 306 to make inoperative a wireless LAN card (NIC) of the terminal 30. The NIC operative/inoperative configuring unit 306, in the case of accepting the instruction to make the NIC inoperative, outputs the instruction to make the NIC inoperative to the NIC control unit 307. In addition, when a certain period of time elapses after that, the NIC operative/inoperative configuring unit 306 outputs the instruction to make the NIC operative to the NIC control unit 307.

In addition, the connection establishment determination unit 303 determines whether the connection has been established between the terminal 30 and a network of the switch destination, and in the case where the connection has been established, notifies the connection establishment packet transmission unit 302 of the fact. Then, the connection establishment packet transmission unit 302, when the connection is established in the terminal 30, transmits a packet certifying the fact to the access point of the connection destination.

[System Operation]

Then, an operation of the quarantine network system 100 in the Embodiment 1 of the present invention will be described using FIG. 5 to FIG. 9. In the following description, FIG. 1 to FIG. 4 will be referred to suitably.

[The Case where a Quarantine Command is Outputted to the Terminal 30]

Figure 5:
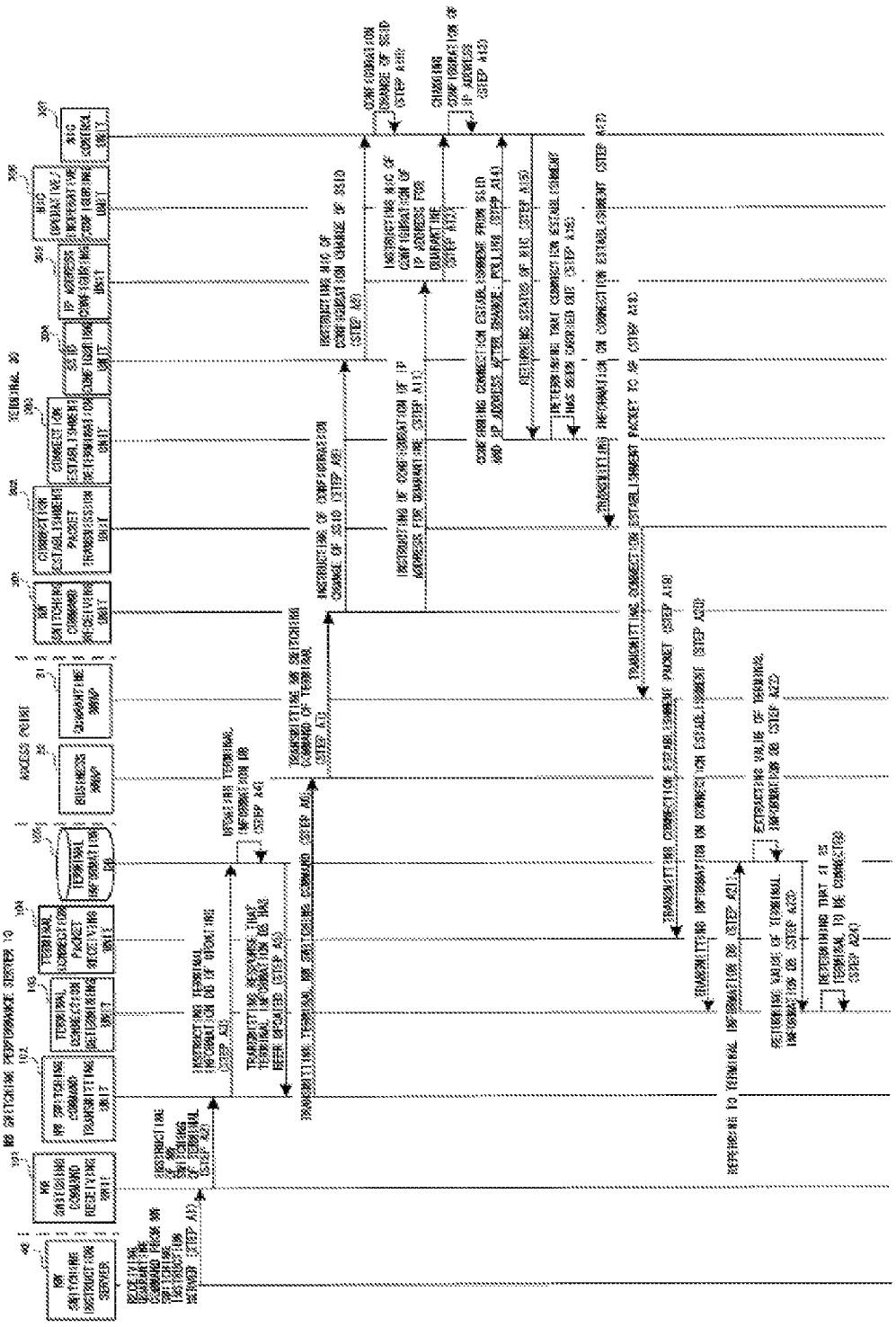
FIG. 5 is a sequence diagram showing a first example of an operation of the quarantine network system in the Embodiment 1 of the present invention.

FIG. 5 is a sequence diagram showing a first example of an operation of the quarantine network system in the Embodiment 1 of the present invention. In FIG. 5, processes in the case where the quarantine command is outputted to the terminal 30 are shown.

As shown in FIG. 5, first, the NW switching instruction server 40 transmits to the NW switching performance server 10 a command (quarantine command) instructing to quarantine the terminal 30 (Step A1). Then, in the NW switching performance server 10, the NW switching command receiving unit 101, when receiving the quarantine command, transmits to the NW switching command transmission unit 102 a command instructing to switch the terminal 30 to the network for quarantining (Step A2).

The NW switching command transmitting unit 102, accepting the command, accesses the terminal information DB 105, and performs instructing of updating (Step A3). Thereby, the terminal information DB 105 updates the terminal information with respect to the terminal 30 (Step A4). Then, the terminal information DB 105 responds to the NW switching command transmitting unit 102 that it has updated the terminal information of the terminal 30 (Step A5).

Then, the NW switching command transmitting unit 102, when updating of the terminal information in the terminal information DB 105 is completed, transmits the NW switching command to the access point 20 for the business NW (Step A6). Thereby, the access point 20 for the business NW transmits a network switching instruction to the terminal 30 based on the NW switching command (Step A7).

When Step A7 is carried out, in the terminal 30, the NW switching command receiving unit 301 receive the NW switching command instructing of quarantining to the network for quarantining. Then, the NW switching command receiving unit 301 sends the instruction for the SSID configuring unit 304 to switch the configuration of the SSID (Step A8).

Then, based on the NW switching command, the SSID configuring unit 304 sends the instruction for the NIC control unit 307 to switch the SSID (Step A9). When Step A9 is carried out, the NIC control unit 307 switches the SSID and configures the SSID of the access point 21 for the quarantine NW (Step A10).

In addition, in association with above-mentioned Step A8, the NW switching command receiving unit 301 transmits the instruction for the IP address configuring unit 305 to configure an IP address for the network for quarantining as a terminal IP address (Step A11). When Step A11 is carried out, the IP address configuring unit 305 transmits the instruction to the NIC control unit 307 (Step A12). Thereby, the NIC control unit 307 switches the IP address (Step A13).

In addition, in the terminal 30, the connection establishment determination unit 303 has inquired from the NIC control unit 307 periodically which network it has been connected with (Step A14). Then, the NIC control unit 307 responds to the connection establishment determination unit 303 with respect to the inquiry result (status of the NIC) (Step A15).

Then, the connection establishment determination unit 303, based on the response from the NIC control unit 307, determines whether the terminal 30 has been connected to the network specified by the NW switching instruction server 40, i.e., the network for quarantining (Step A16).

Then, the connection establishment determination unit 303, in the case of determining that the connection has been established in Step A16, transmits the information showing that the connection has been established to the connection establishment packet transmission unit 302 (Step A17). Then, the connection establishment packet transmission unit 302 transmits the information (packet) showing that the connection between the terminal 30 and the network for quarantining has been established to the access point 21 for the quarantine NW (Step A18).

Then, when Step A18 is carried out, the access point 21 for the quarantine NW transmits a connection establishment packet showing that the connection with the terminal 30 has been established to the terminal connection packet receiving unit 104 of the NW switching performance server 10 (Step A19).

Then, the terminal connection packet receiving unit 104 transmits to the terminal connection determining unit 103 the information showing that the terminal 30 has been connected to the access point 21 for the quarantine NW (Step A20). Thereby, the terminal connection determining unit 103 accesses the terminal information DB 105, and refers to this (Step A21).

Then, the terminal information DB 105 takes out the information of the terminal 30 (Step A22), and transmits the taken-out information of the terminal 30 to the terminal connection determining unit 103 (Step 23). Then, the terminal connection determining unit 103 refers to the information with respect to the terminal 30 acquired at Step A20 and the terminal information of the terminal 30 which the terminal information DB 105 holds, and performs determination whether the terminal 30 is to be connected with the network for quarantining (Step A24). In the case where the terminal 30 is to be connected to the business network as the result of the determination, the processes in the NW switching performance server 10 are finished.

[The Case where a Restoration Command is Outputted to the Quarantined Terminal 30]

Figure 6:
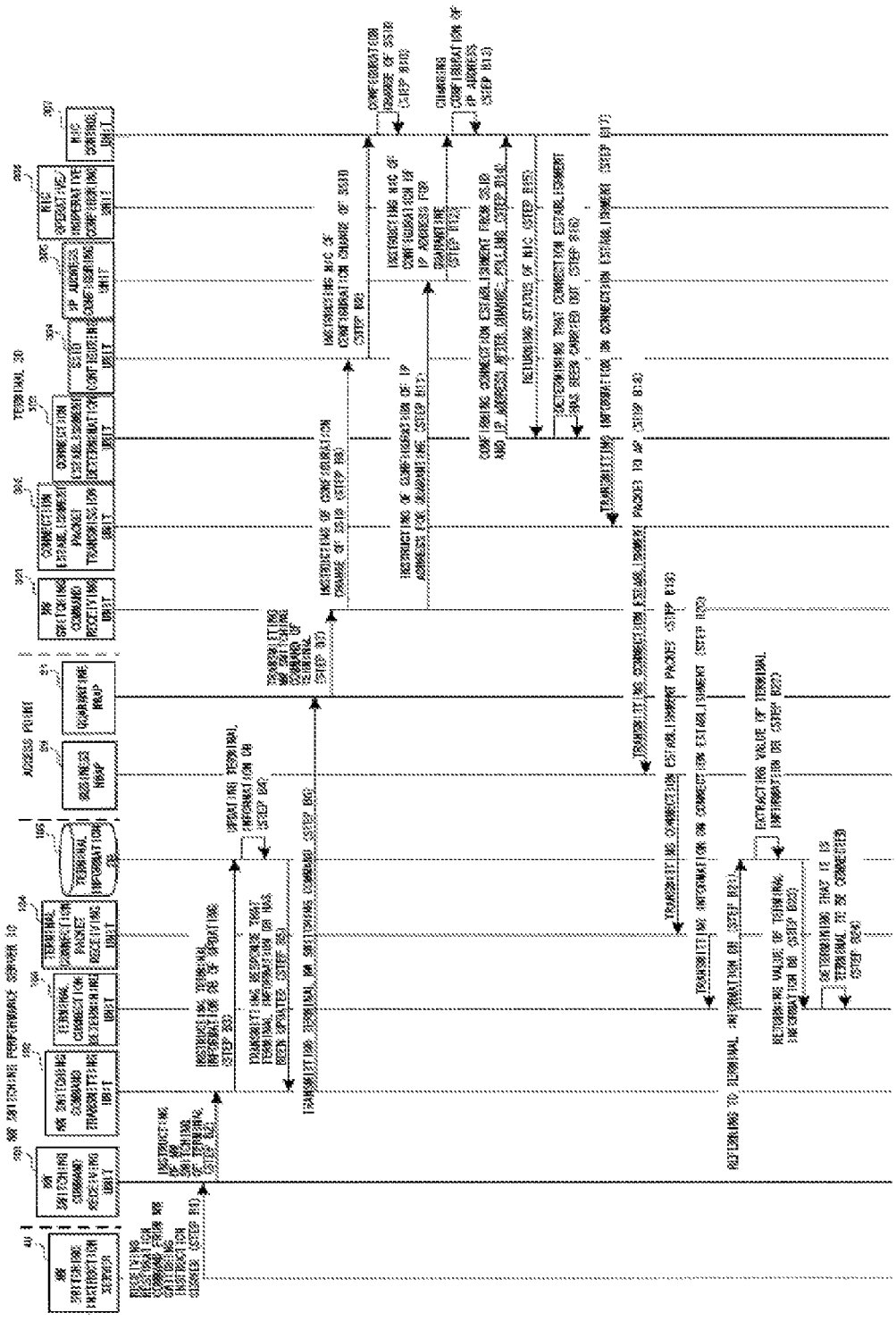
FIG. 6 is a sequence diagram showing a second example of the operation of the quarantine network system in the Embodiment 1 of the present invention.

FIG. 6 is a sequence diagram showing a second example of the operation of the quarantine network system in the Embodiment 1 of the present invention. In FIG. 6, processes in the case where the restoration command is outputted to the quarantined terminal 30 are shown.

Specifically, in processes shown in FIG. 6, in place of the processes connecting the terminal 30 shown in FIG. 5 to the network for quarantining, processes connecting the terminal 30 to the business network are carried out. However, the processes shown in FIG. 6 are the same as the processes shown in FIG. 5 substantially, except that the network and the SSID of the switch destination are different.

As shown in FIG. 6, first, the NW switching instruction server 40 transmits to the NW switching performance server 10 a command (restoration command) instructing to restore the terminal 30 to the business network (Step B1). Then, in the NW switching performance server 10, the NW switching command receiving unit 101, when receiving the restoration command, transmits to the NW switching command transmission unit 102 a command instructing to switch the terminal 30 to the business network (Step B-2).

The NW switching command transmitting unit 102, when accepting the command, accesses the terminal information DB 105, and performs instructing of updating (Step B3). Thereby, the terminal information DB 105 updates the terminal information with respect to the terminal 30 (Step B4), and responds to the NW switching command transmitting unit 102 that it has updated the terminal information of the terminal 30 (Step B5).

Then, the NW switching command transmitting unit 102, when updating of the terminal information in terminal information DB 105 is completed, transmits the NW switching command to the access point 21 for the quarantine (Step B6). Step B6 is a different step from Step A5 shown in FIG. 5. Thereby, the access point 21 for the quarantine, based on the NW switching command, transmits the network switching instruction to the terminal 30 (Step B7).

When Step B7 is carried out, in the terminal 30, the NW switching command receiving unit 301 receives the NW switching command instructing of restoration to the business network, and sends the instruction for the SSID configuring unit 304 to switch the configuration of the SSID (Step B8).

Then, the SSID configuring unit 304, based on the NW switching command, sends the instruction for the NIC control unit 307 to switch the SSID (Step B9). The NIC control unit 307 switches the SSID and configures the SSID of the access point 20 for the business NW (Step B10).

In addition, in association with above-mentioned Step B8, the NW switching command receiving unit 301 transmits the instruction for the IP address configuring unit 305 to configure an IP address for the network for quarantining as a terminal IP address (Step B11). The IP address configuring unit 305 transmits the instruction to the NIC control unit 307 (Step B12). The NIC control unit 307 switches the IP address (Step B13).

In addition, the connection establishment determination unit 303 has inquired from the NIC control unit 307 periodically which network it has been connected with (Step B14). The NIC control unit 307 responds to the connection establishment determination unit 303 with respect to the inquiry result (status of the NIC) (Step B15).

Then, the connection establishment determination unit 303, based on the response from the NIC control unit 307, determines whether the terminal 30 has been connected to the business network specified by the NW switching instruction server 40 (Step B16).

Then, the connection establishment determination unit 303, when determining that connection has been established in Step B16, transmits information showing that the connection has been established to the connection establishment packet transmission unit 302 (Step B17). Then, the connection establishment packet transmission unit 302 transmits the information (packet) showing that the connection between the terminal 30 and the business network has been established to the access point 21 for the quarantine NW (Step B18).

Then, when Step B18 is carried out, the access point for the business NW 20 transmits the connection establishment packet showing that the connection with the terminal 30 has been established to the terminal connection packet receiving unit 104 of the NW switching performance server 10 (Step B19).

Then, the terminal connection packet receiving unit 104 transmits to the terminal connection determining unit 103 the information showing that the terminal 30 has been connected to the access point 21 for the business NW (Step B20). Thereby, the terminal connection determining unit 103 accesses the terminal information DB 105, and refers to this (Step B21).

Then, the terminal information DB 105 takes out the information of the terminal 30 (Step B22), and transmits the taken-out information of the terminal 30 to the terminal connection determining unit 103 (Step 23). Then, the terminal connection determining unit 103 refers to the information with respect to the terminal 30 acquired at Step B20 and the terminal information of the terminal 30 which the terminal information DB 105 holds, and carries out determining whether the terminal 30 is to be connected to the business network (Step B24). In the case where the terminal 30 is to be connected to the business network as the result of the determination, the processes in the NW switching performance server 10 are finished.

[The Case where Two Terminals to be Quarantined Exist]

Figure 7:
FIG. 7 is a sequence diagram showing a third example of the operation of the quarantine network system in the Embodiment 1 of the present invention.

FIG. 7 is a sequence diagram showing a third example of the operation of the quarantine network system in the Embodiment 1 of the present invention. In FIG. 7, processes in the case where two terminals to be quarantined exist are shown.

Specifically, although two units of the terminal 30 and terminal 31 are objects to be quarantined, it is assumed that only one unit can be connected to the access point 21 for the quarantine NW, and the terminal 30 has been already connected. In this case, the processes shown in FIG. 7 are carried out.

As shown in FIG. 7, first, in the state where the terminal 30 has been connected to the access point 21 for the quarantine NW, the NW switching instruction server 40 transmits to the NW switching performance server 10 a command (quarantine command) instructing to quarantine the terminal 31 (Step C1).

Then, Steps C2 to C15 are carried out. Steps C2 to C15 are the same as Steps A2 to A15 shown in FIG. 5.

Then, after execution of Step C15, the connection establishment determination unit 303, based on the response from the NIC control unit 307, determines whether the terminal 31 has been connected to the network for quarantining specified by the NW switching instruction server 40 (Step C16).

At this time, in an example of FIG. 7, since the terminal 30 occupies the connection with the access point 21 for the quarantine NW, the terminal connection determining unit 313 determines that the terminal 31 can not be connected to the network for quarantining.

Consequently, while processes of Steps C1 to C16 continue, a restoration process is carried out for the terminal 30. Specifically, Steps C17 to C24 are carried out. In addition, Steps C17 to C24 are substantially the same processes as Steps B1 to B24 shown in FIG. 6. Then, when the terminal 30 is restored to the business network, the occupancy of the access point 21 for the quarantine NW is released, and the terminal 31 will be able to be connected with the access point 21 for the quarantine NW.

Then, in the terminal 31, the connection establishment determination unit 303 has inquired from the NIC control unit 307 periodically which network it has been connected with (Step C25). Then, the NIC control unit 307 responds to the connection establishment determination unit 303 with respect to the inquiry result (status of the NIC) (Step C26).

Then, the connection establishment determination unit 303, based on the response from the NIC control unit 307, determines whether the terminal 31 has been connected to the network specified by the NW switching instruction server 40, i.e., the network for quarantining (Step C27).

After that, Steps C28 to C35 are carried out. Steps C28 to C35 are the same as Steps A17 to A24 shown in FIG. 5. In addition, a state chart of the terminal 30 and terminal 31 in the case where Steps C1 to C35 shown in FIG. 7 are carried out is shown in FIG. 8. In FIG. 8, "AP" is the abbreviation of access point.

[The Case where there is a Violation in a Quarantining Order in Two Units of the Terminals to be Quarantined]

Figure 9:
FIG. 9 is a sequence diagram showing a fourth example of the operation of the quarantine network system in the Embodiment 1 of the present invention.

FIG. 9 is a sequence diagram showing a fourth example of an operation of the quarantine network system in the Embodiment 1 of the present invention. In FIG. 9, processes in the case where there is a violation in the quarantining order in two units of the terminals are shown.

Specifically, although two units of the terminal 30 and terminal 31 are objects to be quarantined, and an order of quarantining and restoring is the order of the terminal 30 to the terminal 31, it is assumed that the case where the process of the terminal 31 advances first, and the terminal 31 has occupied the access point 21 for the quarantine NW ahead of the terminal 30. In this case, processes shown in FIG. 9 are carried out.

As shown in FIG. 9, the NW switching instruction server 40 transmits to the NW switching performance server 10 a command (quarantine command) instructing to quarantine the terminal 30 (Step D1). After that, Steps D2 to D7 are carried out, and the access point 20 for the business NW transmits the network switching instruction to the terminal 30 based on the NW switching command. Steps D1 to D7 are the same steps as Steps A1 to A7 shown in FIG. 5.

On the other hand, the NW switching instruction server 40 has transmitted to the NW switching performance server 10 a command (quarantine command) instructing to quarantine the terminal 31, apart from Step D1 (Step D8). Then, Steps D9 to D30 are carried out, and it is assumed that the process for connecting the terminal 31 to the network for quarantining has been carried out ahead of the terminal 30. Steps D8 to D30 are the same steps as Steps A1 to A23 shown in FIG. 5.

Then, after the communication between the terminal 31 and the network for quarantining is established, in the NW switching performance server 10, the terminal connection determining unit 103 refers to the information of the terminal 31 transmitted at Step D27 by the terminal connection packet receiving unit 104 and the terminal information of the terminal 31 which the terminal information DB 105 holds. Then, the terminal connection determining unit 103 carries out determining whether the terminal 31 is to be connected to the network for quarantining (Step D31), and determines that the terminal 31 is not to be connected to the network for quarantining, and that the terminal 30 is to be connected first to the access point 21 for the quarantine NW.

Then, the terminal connection determining unit 103 instructs the NW switching command transmitting unit 102 to make the NIC of the terminal 31 inoperative during a certain period of time (Step D32). Thereby, the NW switching command transmitting unit 102 transmits to the access point 21 for the quarantine NW a command making the NIC of the terminal 31 inoperative during a certain period of time (Step D33).

Then, the access point 21 for the quarantine NW transmits the received command to the NW switching command receiving unit 301 of the terminal 31 (Step D34). Thereby, in the terminal 31, the NW switching command receiving unit 301 instructs the NIC operative/inoperative configuring unit 316 to make the NIC inoperative during a certain period of time (Step D35). As a result, the NIC operative/inoperative configuring unit 306 perform this instruction to the NIC control unit 307 (Step D36), and the NIC control unit 307 makes the NIC inoperative during a certain period of time (Step D37).

After that, the NIC operative/inoperative configuring unit 306 stands by until the certain period of time elapses (Step D38), and after the certain period of time has elapsed, instructs the NIC control unit 307 to make the NIC operative (Step D39). Thereby, in the terminal 31, the NIC control unit 307 makes the NIC operative (Step D40).

Although not shown in FIG. 9, while the NIC of the terminal 31 has been made to be inoperative by Steps D36 to D38, the terminal 30 occupies the access point 21 for the quarantine NW. In addition, in the case where the terminal 30 has not occupied the access point 21 for the quarantine NW after the execution of Step D40, Steps D32 to D40 are carried out again.

[Program]

A program in the present Embodiment 1 may be a program to make a computer execute Steps A2 to A6, and A20 to A24, which are shown in FIG. 5, and Steps B2 to B6, and B20 to B24, which are shown in FIG. 6, and Steps C2 to C6, C18 to C22, and C31 to C35, which are shown in FIG. 7, and Steps D2 to D7, D9 to D13, and D27 to D33 which are shown in FIG. 9. By installing this program in the computer and executing it, the NW switching performance server 10 in the present Embodiment 1 can be realized.

In this case, a CPU (Central Processing Unit) of the computer functions and performs processing as the NW switching command receiving unit 101, the NW switching command transmitting unit 102, the terminal connection determining unit 103, and the terminal connection packet receiving unit 104. In addition, the terminal information DB 105 is realized by a storage device such as a hard disk or the like provided in the computer.

Effect of Embodiment 1

As mentioned above, according to the present Embodiment 1, in the wireless LAN access point used for the connection to the network for quarantining, the number of terminals connectable thereto is restricted to one unit.

Therefore, in the wireless LAN environment, the mutual infection with a computer virus among terminals within the network for quarantining is prevented.

In addition, in the case where the number of terminals to be quarantined is two or more, since the maximum connectable number of the access point for the quarantine NW is 1, among terminals in which the SSID have been switched, there exist terminals which can not perform communication.

However, the terminals which can not perform communication, owing to a standard function of a network card (NIC) of a terminal, will be able to be connected to the network for quarantining by being triggered by that one terminal which has been quarantined is restored to the business network and that the connection of the access point for the quarantine NW is released.

Embodiment 2

Then, a quarantine network system, a server apparatus, and a program in Embodiment 2 of the present invention will be described with reference to FIG. 10 to FIG. 12.
[System Configuration]

At the beginning, a configuration of the quarantine network system 200 in the present Embodiment 2 will be described using FIG. 10 and FIG. 11. FIG. 10 is a block diagram showing the configuration of the quarantine network system in the Embodiment 2 of the present invention. FIG. 11 is a block diagram showing a configuration of a network switching performance server in the Embodiment 2 of the present invention.

Figure 10:
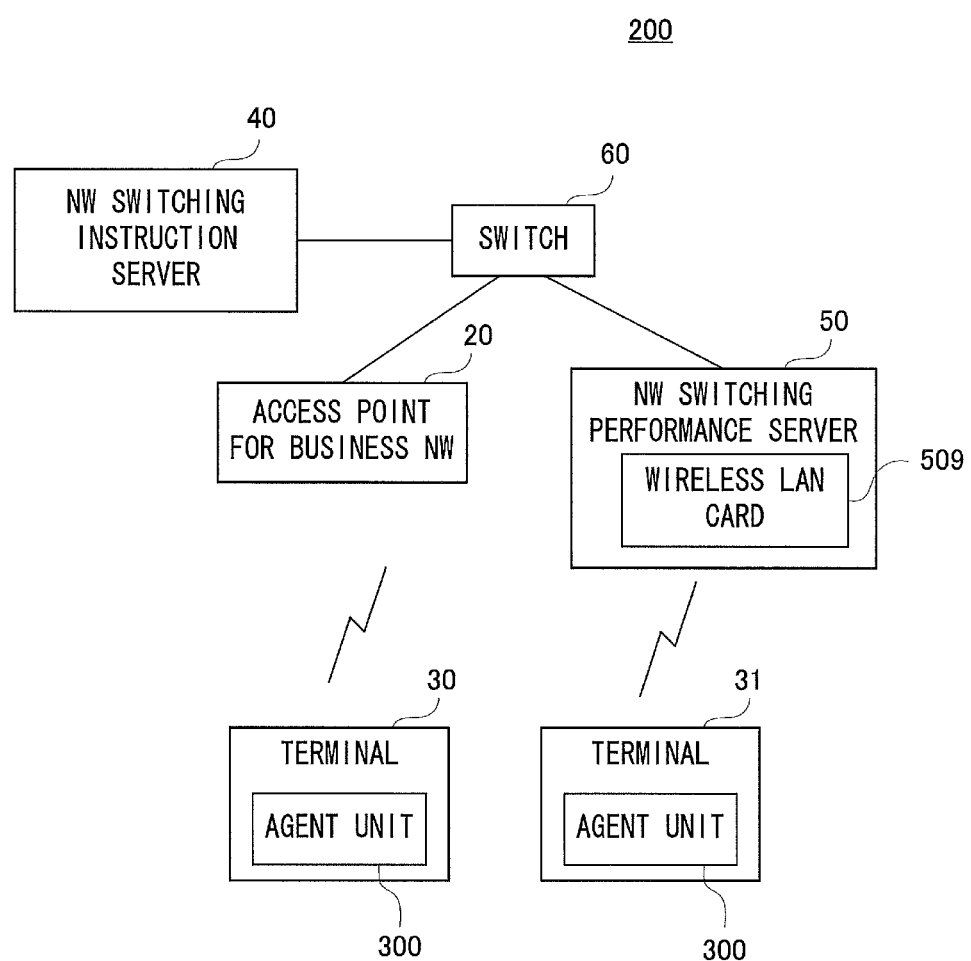
FIG. 10 is a block diagram showing a configuration of a quarantine network system in Embodiment 2 of the present invention.

The quarantine network system 200 in the present Embodiment 2 shown in FIG. 10 is a system for quarantining the terminal 30 and terminal 31 which are connected to the network via the wireless communication in the same way as the quarantine network system 100 in the Embodiment 1 shown in FIG. 1. However, the present Embodiment 2 differs from the Embodiment 1 at a point of a configuration and function of an NW switching instruction server 50. Hereinafter, differences from the Embodiment 1 will be mainly described.

As shown in FIG. 10, in the present Embodiment 2, the quarantine network system 200 is not provided with the access point 21 for the quarantine NW shown in FIG. 1, but instead, an NW switching performance server 50 is provided with a wireless LAN card 509, and the wireless LAN card 509 functions as the access point for the quarantine NW.

Figure 11:
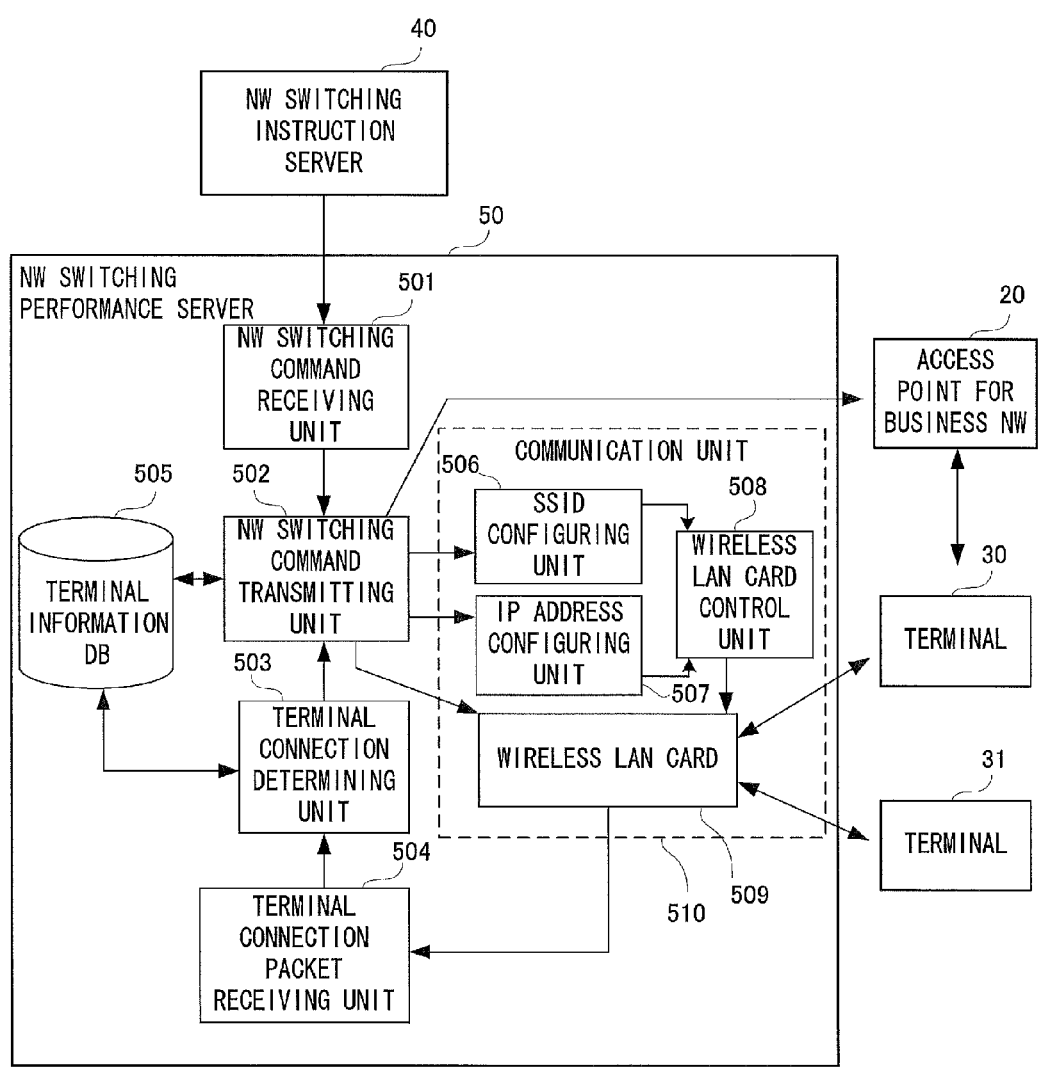
FIG. 11 is a block diagram showing a configuration of a network switching performance server in the Embodiment 2 of the present invention.

In addition, as shown in FIG. 11, the NW switching performance server 50 comprises an NW switching command receiving unit 501, an NW switching command transmitting unit 502, a terminal connection determining unit 503, a terminal connection packet receiving unit 504, a terminal information database (DB) 505 which stores information of a terminal, and a communication unit 510.

Among these, the NW switching command receiving unit 501, the NW switching command transmitting unit 502, the terminal connection determining unit 503, the terminal connection packet receiving unit 504, and the terminal information DB 505 are the same as the NW switching command receiving unit 101, the NW switching command transmitting unit 102, the terminal connection determining unit 103, the terminal connection packet receiving unit 104, and the terminal information DB 105, respectively.

On the other hand, the communication unit 510 is included only in the NW switching performance server 50. The communication unit 510 performs an ad hoc communication to or from terminal, and it functions as the wireless LAN access point (access point for the quarantine NW) used for the connection to the network for quarantining.

Specifically, the communication unit 510 comprises a SSID configuring unit 506, an IP address configuring unit 507, a wireless LAN card control unit 508, and a wireless LAN card 509. The SSID configuring unit 506 receives instructions of configuration switching of the SSID of the wireless LAN card 509 from the NW switching command transmitting unit 502. Then, the SSID configuring unit 506 outputs the corresponding instructions to the wireless LAN card control unit 508.

In addition, the IP address configuring unit 507 receives instructions of the configuration switching of the IP address of the wireless LAN card 509 from the NW switching command transmitting unit 102. Then, the IP address configuring unit 507 also outputs the corresponding instructions to the wireless LAN card control unit 508.

The wireless LAN card control unit 508, when receiving instructions from the SSID configuring unit 506 and IP address configuring unit 507, controls the wireless LAN card 509 in accordance with these instructions. Thereby, the wireless LAN card 509 performs ad hoc communication with terminals, and functions as the wireless LAN access point.
[System Operation]

Then, an operation of the quarantine network system 200 in the Embodiment 2 of the present invention will be described using FIG. 12. FIG. 12 is a sequence diagram showing an example of an operation of the quarantine network system in the Embodiment 2 of the present invention. In FIG. 12, processes in the case where a quarantine command is outputted to the terminal 30 are shown. In the following description, FIG. 10 and FIG. 11 will be referred to suitably.

Figure 12:
FIG. 12 is a sequence diagram showing an example of an operation of the quarantine network system in the Embodiment 2 of the present invention.

As shown in FIG. 12, first, the NW switching instruction server 40 transmits to the NW switching performance server 50 a command (quarantine command) instructing to quarantine the terminal 30 (Step E1). Then, in the NW switching performance server 10, the NW switching command receiving unit 501, when receiving the quarantine command, transmits to the NW switching command transmission unit 502 the command instructing to switch the terminal 30 to the network for quarantining (Step E2).

The NW switching command transmitting unit 502, when accepting the command, accesses the terminal information DB 505, and instructs to perform the updating (Step E3). Thereby, the terminal information DB 505 updates the terminal information with respect to the terminal 30 (Step E4). Then, the terminal information DB 505 responds to the NW switching command transmitting unit 502 that it has updated the terminal information of the terminal 30 (Step E5).

Then, the NW switching command transmitting unit 502, when the updating of the terminal information in the terminal information DB 105 has been completed, transmits the instruction for the SSID configuring unit 506 to carry out the configuration change of the SSID of the wireless LAN card 509 (Step E6). Subsequently, the SSID configuring unit 506 transmits to the wireless LAN card control unit 508 the command instructing to carry out the configuration change of the SSID of the wireless LAN card 509 (Step E7).

Then, the wireless LAN card control unit 508, when accepting the command, instructs the wireless LAN card 509 of the configuration change of the SSID (Step E8). Thereby, the wireless LAN card 509 changes the configuration of the SSID in accordance with the instruction (Step E9).

In addition, in association with above-mentioned Step E6, the NW switching command transmitting unit 502 transmits the instruction to the IP address configuring unit 507 to carry out the configuration change of the IP address of the wireless LAN card 509 (Step E10). Subsequently, the IP address configuring unit 507 transmits to the wireless LAN card control unit 108 the command instructing to carry out the configuration change of the IP address of the wireless LAN card 509 (Step E11).

Then, the wireless LAN card control unit 508, when accepting the command, instructs the wireless LAN card 509 of the configuration change of the IP address (Step E12).

Thereby, the wireless LAN card 509 changes the configuration of the IP address in accordance with the instruction (Step E13).

Then, the NW switching command transmitting unit 502 transmits an NW switching command to the access point 20 for the business NW (Step E14). Thereby, the access point 20 for the business NW, based on the NW switching command, transmits the network switching instruction to the terminal 30 (Step E15).

Then, in the terminal 30, the NW switching command receiving unit 301 receives the NW switching command instructing of quarantining to the network for quarantining. Then, the NW switching command receiving unit 301 sends the instruction for the SSID configuring unit 304 to switch the configuration of the SSID (Step E16).

Then, the SSID configuring unit 304, based on the NW switching command, sends the instruction for the NIC control unit 307 to switch the SSID (Step E17). When Step E17 is carried out, the NIC control unit 307 switches the SSID and configures the SSID of the wireless LAN card 509 in the NW switching performance server 50 (Step E18).

In addition, in association with above-mentioned Step E16, the NW switching command receiving unit 301 transmits the instruction for the IP address configuring unit 305 to configure the IP address for the quarantine network as the terminal IP address (Step E19). When Step E19 is carried out, the IP address configuring unit 305 transmit the instruction to the NIC control unit 307 (Step E20). Thereby, the NIC control unit 307 switches the IP address (Step E21).

In addition, in the terminal 30, the connection establishment determination unit 303 has inquired from the NIC control unit 307 periodically which network it has been connected with (Step E22). Then, the NIC control unit 307 responds to the connection establishment determination unit 303 with respect to the inquiry result (status of the NIC) (Step E23).

Then, the connection establishment determination unit 303, based on the response from the NIC control unit 307, determines whether the terminal 30 has been connected to the network for quarantining specified by the NW switching instruction server 40 (Step E24). At this time, the communication between the terminal 30 and the NW switching performance server 50 will be an ad hoc communication.

Then, in Step E24, the connection establishment determination unit 303, when determining that connection has been established, transmits information showing that the connection has been established to the connection establishment packet transmission unit 302 (Step E25). Then, the connection establishment packet transmission unit 302 transmits the information (packet) showing that the connection between the terminal 30 and the network for quarantining has been established to the wireless LAN card 509 of the NW switching performance server 50 (Step E26).

Then, when Step E26 is carried out, the wireless LAN card 509 transmits the connection establishment packet showing that the connection with the terminal 30 has been established to the terminal connection packet receiving unit 504 of the NW switching performance server 50 (Step E27).

Then, the terminal connection packet receiving unit 504 transmits to the terminal connection determining unit 503 the information showing that the terminal 30 has been connected to the wireless LAN card 509 (Step E28). Thereby, the terminal connection determining unit 503 accesses the terminal information DB 505, and refers to this (Step E29).

Then, the terminal information DB 505 takes out the information of the terminal 30 (Step E30), and transmits the taken-out information of the terminal 30 to the terminal connection determining unit 503 (Step E31). Then, the terminal connection determining unit 503 refers to the information with respect to the terminal 30 acquired at Step E28 and to the terminal information of the terminal 30 which the terminal information DB 505 holds, and performs determining whether the terminal 30 is to be connected with the network for quarantining (Step E32). In the case where the terminal 30 is to be connected to the business network as the result of the determination, the processes in the NW switching performance server 50 are finished.

[Program]

A program in the present Embodiment 2 may be a program to make the computer execute Steps E2 to E14, and E28 to E32 which are shown in FIG. 12. By installing this program in the computer and executing it, the NW switching performance server 50 in the present Embodiment 2 can be realized.

In this case, the CPU (Central Processing Unit) of the computer functions and performs processing as the NW switching command receiving unit 501, the NW switching command transmitting unit 502, the terminal connection determining unit 503, the terminal connection packet receiving unit 504, the SSID configuring unit 506, the IP address configuring unit 507, and the wireless LAN card control unit 508. In addition, the terminal information DB 505 is realized by a storage device such as a hard disk or the like provided in the computer.

Effect of Embodiment 2

As mentioned above, according to the present Embodiment 2, since the NW switching performance server 50 can function as the wireless LAN access point of the network for quarantining, it will be possible to reduce a cost for installing the wireless LAN access point, and to reduce a system implementation cost. In addition, even in the case where the present Embodiment 2 is used, the effect described in the Embodiment 1 can be acquired.

[Configuration of Computer]

Figure 13:
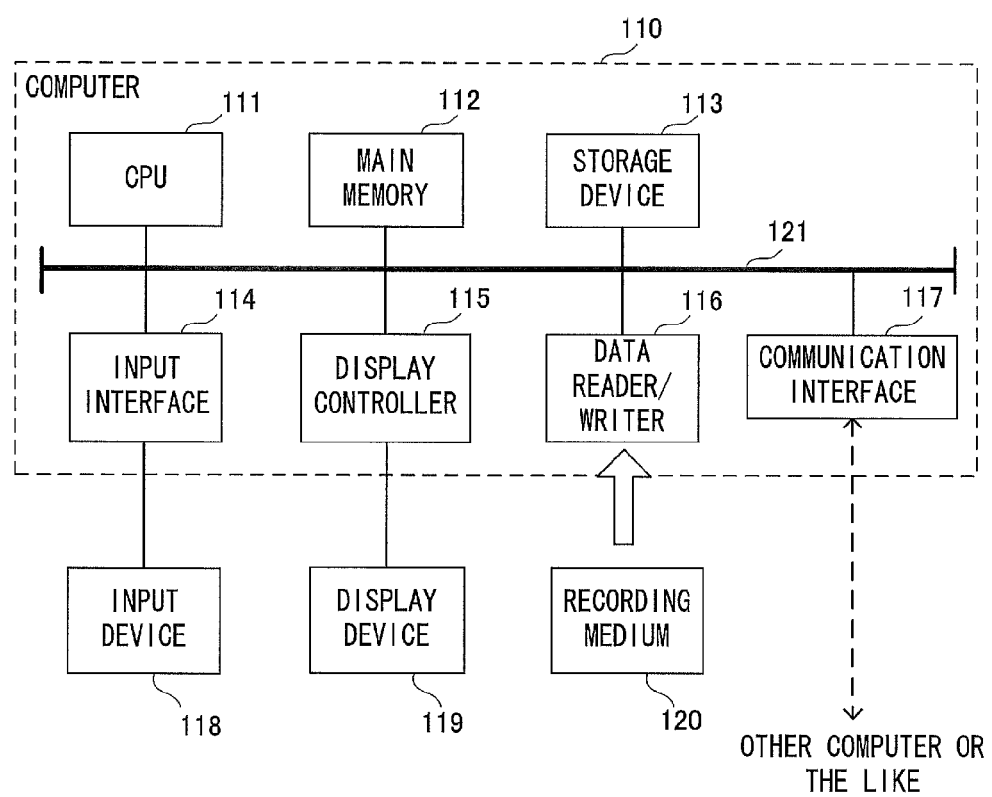
FIG. 13 is a block diagram showing an example of a computer which realizes a server apparatus in the Embodiments 1 and 2 of the present invention.

Here, a computer realizing the NW switching performance server by executing programs in the Embodiments 1 and 2 will be described using FIG. 13. FIG. 13 is a block diagram showing an example of a computer which realizes a server apparatus in the Embodiments 1 and 2 of the present inventions.

As shown in FIG. 13, the computer 110 includes a CPU 111, a main memory 112, a storage device 113, an input interface 114, a display controller 115, a data reader/writer 116, and a communication interface 117. These parts are interconnected through a bus 121 so as to permit communication of data.

The CPU 111 loads the software programs (code) of this embodiment, which are stored in the storage device 113, in the main memory 112 and performs various operations by executing them in a predetermined order. Typically, the main memory 112 is a volatile storage device, such as a DRAM (Dynamic Random Access Memory), etc. In addition, the software program used in this embodiment is supplied stored on a computer-readable storage medium 120. It should be noted that the software program used in this embodiment may be distributed on the Internet connected via the communication interface 117.

In addition to hard disks, semiconductor storage devices such as flash memory and the like are suggested as a specific example of the storage device 113. The input interface 114 acts as an intermediary for the communication of data between the CPU 111 and input devices 118 such as a keyboard and a mouse. The display controller 115 is connected to a display device 119 and controls the display of the display device 119.

The data reader/writer 116, which acts as an intermediary for the communication of data between the CPU 111 and the storage medium 120, reads out software programs from the storage medium 120 and writes processing results obtained by the computer 110 to the storage medium 120. The communication interface 117 acts as an intermediary for the communication of data between the CPU 111 and other computers. In the Embodiment 2, a wireless LAN card is connected to the communication interface 117.

In addition, general-purpose semiconductor storage devices such as CF (Compact Flash) and SD (Secure Digital), etc., as well as Magnetic storage media such as floppy disks (Flexible Disk) or optical storage media such as CD-ROMs (Compact Disk Read Only Memory) are suggested as specific examples of the storage medium 120.

In addition, while some or all of the above-described embodiments can be represented in the form of the following (Supplementary Note 1)-(Supplementary Note 9), they are not limited to the descriptions below.

(Supplementary Note 1)

A quarantine network system for quarantining a terminal connected to a network via a wireless communication, the quarantine network system comprising:

a first wireless LAN access point used for connection to a business network;

a second wireless LAN access point which is used for connection to a network for quarantining, and which restricts the number of terminals connectable thereto; and a server apparatus transmitting to said terminal a command which makes said terminal switch SSID of an access point which said terminal uses in wireless communication, to SSID of said first wireless LAN access point, or to SSID of said second wireless LAN access point, in accordance with the situation.

(Supplementary Note 2)

The quarantine network system according to Supplementary Note 1, wherein said second wireless LAN access point has restricted the number of terminals accessible thereto to one unit.

(Supplementary Note 3)

The quarantine network system according to Supplementary Note 1, wherein in the case where a plurality of terminals to be connected to said network for quarantining exist, said server apparatus switches in an order where they have been configured said SSID of each of said plurality of terminals to SSID of said second wireless LAN access point.

(Supplementary Note 4)

A server apparatus for switching, in accordance with a quarantine result of a terminal, a network to which said terminal is connected via wireless communication, the server apparatus comprising a network switching command transmitting unit, wherein said network switching command transmitting unit transmits to said terminal a command which makes said terminal switch SSID of an access point which said terminal uses in wireless communication, in accordance with the situation, to SSID of a first wireless LAN access point used for connection to a business network, or to SSID of a second wireless LAN access point which is used for connection to a network for quarantining and restricts the number of terminals connectable thereto.

(Supplementary Note 5)

A computer-readable recording medium recording a program for switching by a computer a network to which a terminal is connected via wireless communication in accordance with a quarantine result of said terminal, wherein the computer-readable recording medium records a program including an instruction to make said computer execute a step of transmitting a command which makes said terminal switch SSID of an access point which said terminal uses in wireless communication, in accordance with the situation, to SSID of a first wireless LAN access point used for connection to a business network, or to SSID of a second wireless LAN access point which is used for connection to a network for quarantining and restricts the number of terminals connectable thereto.

(Supplementary Note 6)

A quarantine network system for quarantining a terminal connected to a network via wireless communication, the quarantine network system comprising:

a wireless LAN access point used for connection to a business network; and a server apparatus, wherein said server apparatus comprises:

a communication unit which performs an ad hoc communication to or from said terminal, and functions as a wireless LAN access point used for connection to a network for quarantining; and a network switching command transmitting unit transmitting a command which makes said terminal switch SSID of an access point which said terminal uses in wireless communication to SSID of said wireless LAN access point or to SSID of said communication unit, in accordance with the situation.

(Supplementary Note 7)

The quarantine network system according to Supplementary Note 6, wherein in the case where a plurality of terminals to be connected to said network for quarantining exist, said network switching command transmitting unit of said server apparatus switches said SSID of each of said plurality of terminals to SSID of said communication unit in an order where they have been configured.

(Supplementary Note 8)

A server apparatus for switching, in accordance with a quarantine result of a terminal, a network to which said terminal is connected via wireless communication, the server apparatus comprising:

a communication unit which performs an ad hoc communication to or from said terminal, and functions as a wireless LAN access point used for connection to a network for quarantining; and a network switching command transmitting unit transmitting a command which makes said terminal switch SSID of an access point which said terminal uses in wireless communication to SSID of a wireless LAN access point used for connection to a business network, or to SSID of said communication unit, in accordance with the situation.

(Supplementary Note 9)

A computer-readable recording medium recording a program for switching by a computer a network to which a terminal is connected via wireless communication in accordance with a quarantine result of said terminal, wherein in the case where said computer performs an ad hoc communication to or from said terminal, and can function as a wireless LAN access point used for connection to a network for quarantining, the computer-readable recording medium records a program including an instruction to make said computer execute a step of transmitting a command which makes said terminal switch SSID of an access point which said terminal uses for wireless communication, in accordance with the situation, to SSID of a wireless LAN access point used for connection to a business network, or to SSID in the case where said computer functions as said wireless LAN access point.

As mentioned above, according to the present invention, it is possible to quarantine terminals individually under the wireless LAN environment. The present invention is useful in various networks where the wireless LAN environments are constructed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A quarantine network system for quarantining a terminal not meeting security requirements connected to a network via a wireless communication, the quarantine network system comprising:
  a first wireless LAN access point configured for connection of terminals to a business network;
  a second wireless LAN access point configured for connection to a network for quarantining terminals not meeting security requirements, and which restricts the number of terminals connectable thereto; and
  a server apparatus configured to transmit to said terminal a command which makes said terminal switch an SSID and associated access point which said terminal uses in wireless communication, to one of the SSID associated with said first wireless LAN access point, and the SSID associated with said second wireless LAN access point, based on whether said terminal meets said security requirements;
  wherein:
    said second wireless LAN access point has restricted the number of terminals accessible thereto to one unit;
    when a plurality of terminals to be connected to said network for quarantining exist, said server apparatus switches the SSID of each of said plurality of terminals to the SSID of said second wireless LAN access point according to the order in which they have been configured;
    in the case that a terminal should be connected to the quarantine network earlier than a different terminal but the different terminal has already been connected to the quarantine network, said server apparatus transmits to said second wireless LAN access point a command making the NIC of the different terminal inoperative during a certain period of time; and
    a restoration process is carried out in which when a first terminal is restored to the business network after being connected to the quarantine network, the occupancy of the second wireless LAN access point is released, and a second terminal is able to be connected to the second wireless LAN access point; and
    the second terminal periodically determines which network it has been connected to based on an inquiry to a NIC control unit.

2. A server apparatus configured to switch, in accordance with a quarantine result of a terminal, a network to which said terminal is connected via wireless communication, the server apparatus comprising:
  a network switching command transmitting unit, and
  a storage storing a first SSID associated with a first wireless LAN access point configured for connection to a business network, and storing a second SSID associated with a second wireless LAN access point configured for connection to a quarantine network;
  wherein said network switching command transmitting unit transmits to said terminal a command to said terminal to one of the first SSID and the second SSID based on whether said terminal meets security requirements; and
  wherein:
    the network switching command transmitting unit restricts the number of terminals connectable to the quarantine network
    said second wireless LAN access point has restricted the number of terminals accessible thereto to one unit;
    when a plurality of terminals to be connected to said network for quarantining exist, said server apparatus switches the SSID of each of said plurality of terminals to the SSID of said second wireless LAN access point according to the order in which they have been configured;
    in the case that a terminal should be connected to the quarantine network earlier than a different terminal but the different terminal has already been connected to the quarantine network, said server apparatus transmits to said second wireless LAN access point a command making the NIC of the different terminal inoperative during a certain period of time;
    a restoration process is carried out in which when a first terminal is restored to the business network after being connected to the quarantine network, the occupancy of the second wireless LAN access point is released, and a second terminal is able to be connected to the second wireless LAN access point; and
    the second terminal periodically determines which network it has been connected to based on an inquiry to a NIC control unit.

3. A non-transitory computer readable medium recording a program for enabling a network switching command unit to implement operations including:
  storing a first SSID associated with a first wireless LAN access point configured for connection of terminals to a business network;
  storing a second SSID associated with a second wireless LAN access point configured for connection of terminals to a quarantine network;
  in response to receiving a quarantine result pertaining to a network-connected terminal, generating a command to the network-connected terminal to switch to one of the first SSID and the second SSID, based on the quarantine result; and
  restricting the number of terminals connectable to the quarantine network
  wherein:
    said second wireless LAN access point has restricted the number of terminals accessible thereto to one unit;
    when a plurality of terminals to be connected to said network for quarantining exist, said server apparatus switches the SSID of each of said plurality of terminals to the SSID of said second wireless LAN access point according to the order in which they have been configured;

in the case that a terminal should be connected to the quarantine network earlier than a different terminal but the different terminal has already been connected to the quarantine network, said server apparatus transmits to said second wireless LAN access point a command making the NIC of the different terminal inoperative during a certain period of time;

a restoration process is carried out in which when a first terminal is restored to the business network after being connected to the quarantine network, the occupancy of the second wireless LAN access point is released, and a second terminal is able to be connected to the second wireless LAN access point; and the second terminal periodically determines which network it has been connected to based on an inquiry to a NIC control unit.

\* \* \* \* \*